Feb. 25, 1947.　　　　H. C. HARBERS　　　　2,416,478
MOTOR VEHICLE TRANSMISSION AND DIFFERENTIAL
WHEEL DRIVE CONTROL MECHANISM THEREFOR
Filed Dec. 6, 1943　　　3 Sheets-Sheet 1
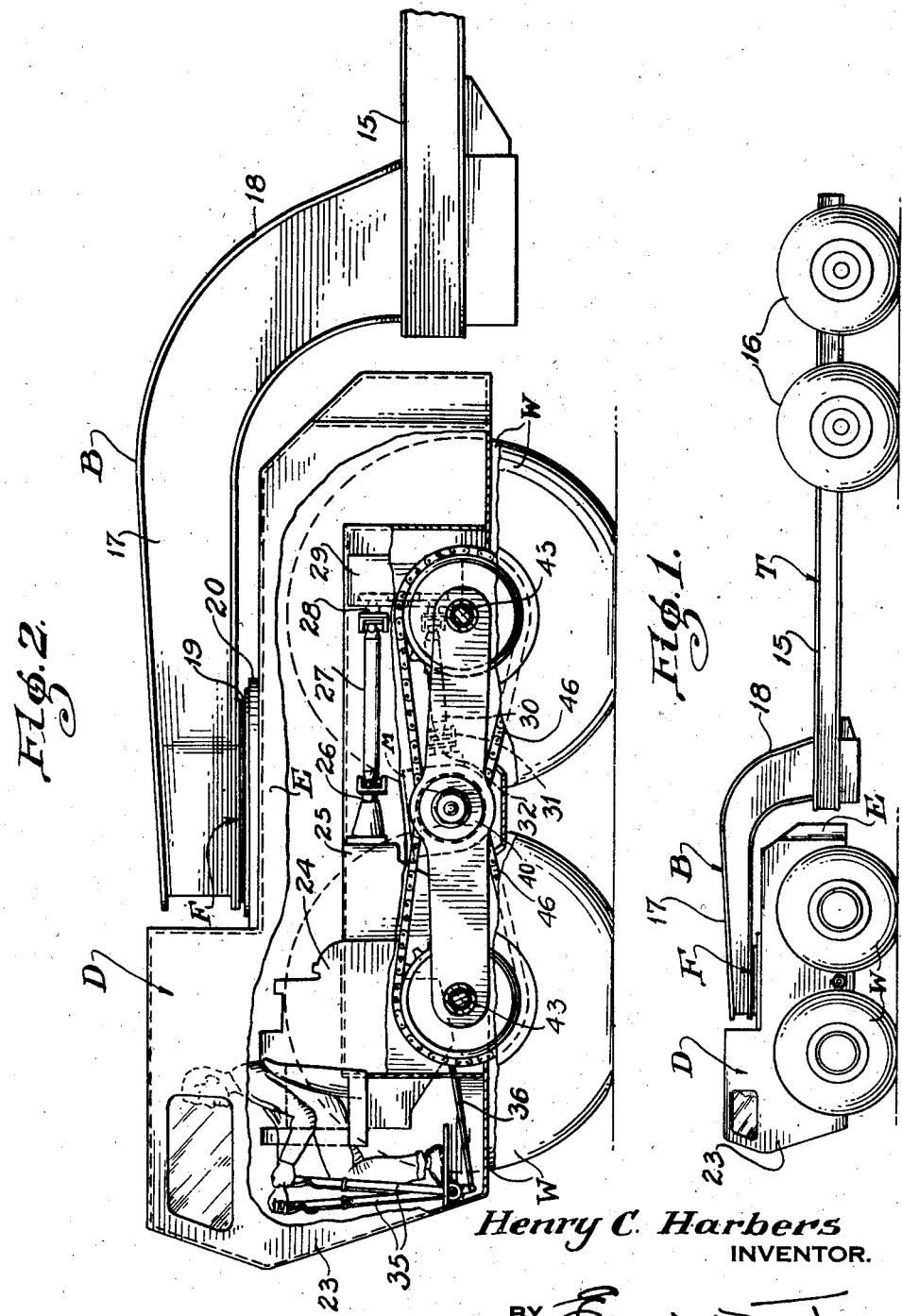
Henry C. Harbers
INVENTOR.
BY
ATTORNEY.

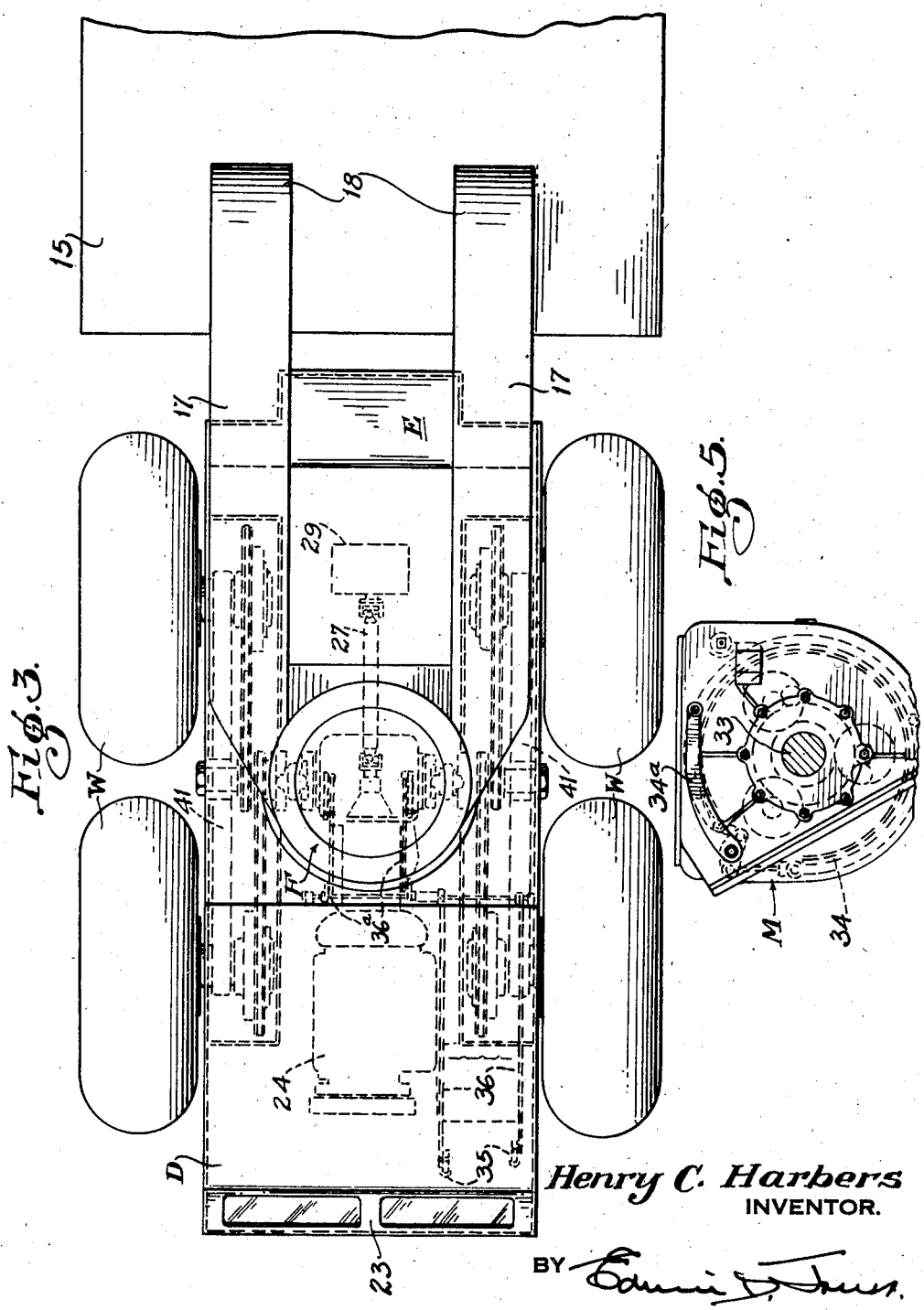

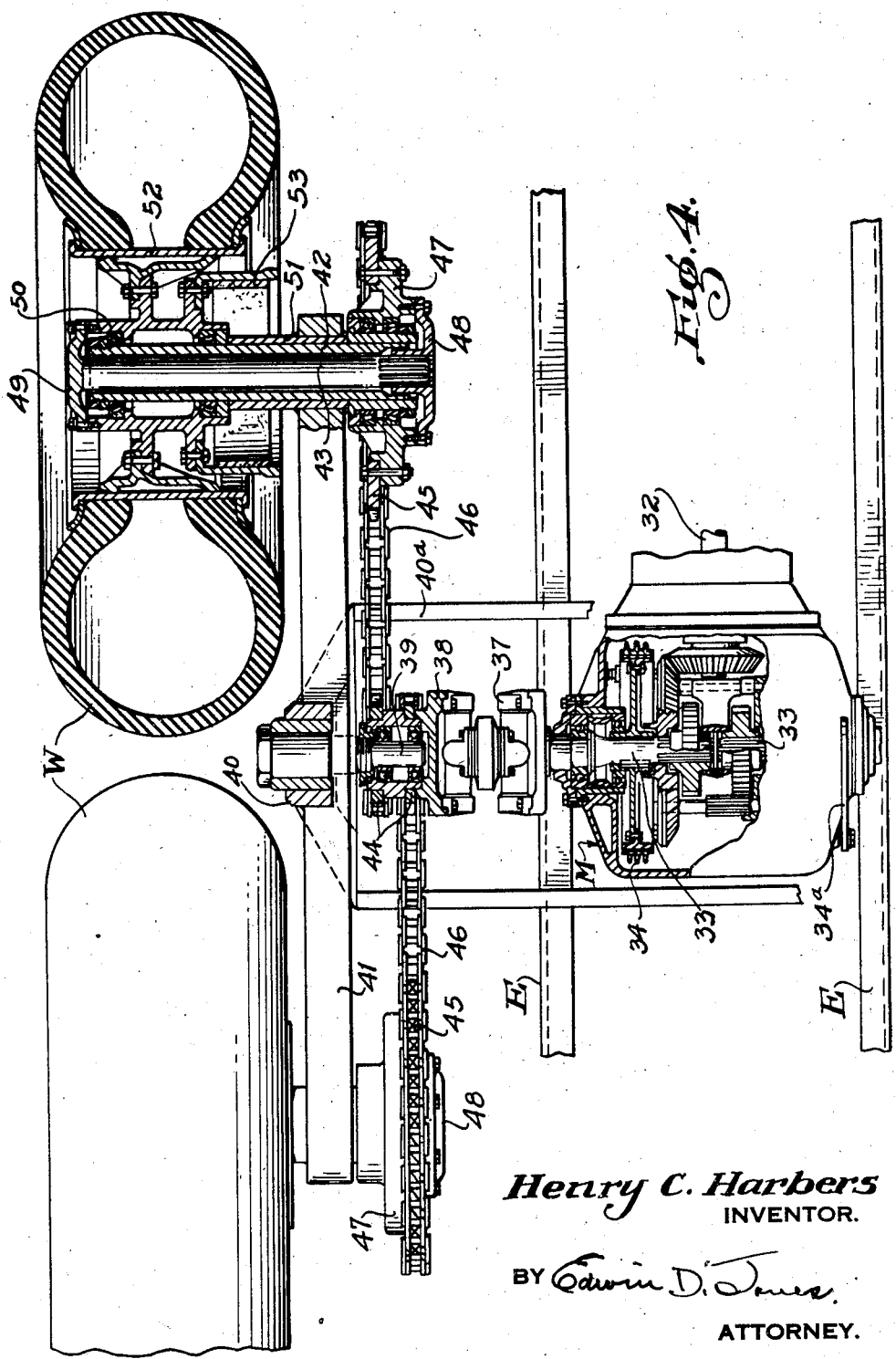

Patented Feb. 25, 1947

2,416,478

UNITED STATES PATENT OFFICE 2,416,478

MOTOR VEHICLE TRANSMISSION AND DIFFERENTIAL WHEEL DRIVE CONTROL MECHANISM THEREFOR

Henry C. Harbers, San Gabriel, Calif., assignor to C. B. Equipment Co., Los Angeles, Calif., a copartnership Application December 6, 1943, Serial No. 513,040

2 Claims. (Cl. 180—17)

My invention relates to motor vehicles and more particularly to a draft unit, and it has for a purpose the provision of a draft unit which is in the form of a four wheel truck, and wherein the wheels at opposite sides of the draft unit frame are mounted for independent vertical movement to provide free and independent actions thereof to compensate for road unevenness, and where the wheels are individually driven through chain and sprocket mechanisms to maintain proper driving relation with the wheels at all times.

Another purpose of my invention is the provision in a motor vehicle as above described, a compact and efficient driving connection between the engine and the chain and sprocket mechanisms, such connection embodying a differential preferably of the controlled type by which differential driving of the wheels at opposite sides of the frame is not only attainable, but also steering of the draft unit to effect steering of the vehicle as a whole.

I will describe only one form of motor vehicle embodying my invention and will then point out the novel features thereof in claims.

In the accompanying drawings:

Fig. 1 is a view, showing in side elevation one form of motor vehicle embodying my invention, and one use to which it may be put.

Fig. 2 is a fragmentary view on an enlarged scale showing the vehicle of Fig. 1 in side elevation.

Fig. 3 is a fragmentary plan view of the vehicle.

Fig. 4 is an enlarged fragmentary plan view, partly in section, showing the driving means for one pair of wheels.

Fig. 5 is a view showing the differential housing in side elevation.

Similar reference characters refer to similar parts in each of the several views.

Referring specifically to the drawings my invention in its present embodiment essentially consists of a trailer unit T and a draft unit D, the former comprising a frame 15 supported at its rear end by traction wheels 16, with the draft unit supporting the frame at its front end. The trailer unit 16 is of conventional form except that its front end is provided with a draft bar B which is of generally U form. The parallel portions 17 of this bar are generally horizontal except at their rear ends 18 where they are curved downwardly and fixed to the forward end of the trailer frame. The rounded bite or forward end of the draft bar is constructed to provide the upper ring 19 of a fifth wheel F, the lower ring 20 of the fifth wheel being rotatably connected to the upper ring and suitably fixed on top of the frame E of the draft unit D.

Manifestly the fifth wheel F provides a connection between the draft bar B and the frame E by which the latter is rotatably connected to the trailer frame 15 to move about the fifth wheel as a center, and by which the draft unit is rendered dirigible to effect steering of the vehicle as a whole.

The draft unit D is in the form of a truck or bogie in that it includes the frame E and four traction wheels W arranged in pairs at opposite sides of the frame and which in the present instance, are provided with pneumatic tires. The frame E may be of the hollow construction shown to accommodate at its under-side the driving means for the traction wheels W and to form a cab 23 at its forward end in which the operator for the vehicle is adapted to be stationed.

The prime mover for the draft unit is a single internal combustion engine 24 located adjacent the forward end of the frame and operatively connected at its rear end to a conventional form of selective transmission 25. The drive shaft 26 extending from the transmission is connected to a second shaft 27 which provides a driving connection between the drive shaft and a driven shaft 28 extending into a transfer case 29 suitably supported on the frame E. This transfer case is of conventional form, and provides a right angle drive connection between the shaft 27 and a shaft 30, the latter extending forwardly from the transfer case and operatively connected by a universal joint 31 to the shaft 32 of a differential mechanism M.

The differential mechanism M is preferably of the controlled type in that the two jack shafts 33 are provided with brakes 34 by which rotation of the shafts can be manually and independently controlled by the operator in the cab 23. For this purpose two levers 35 are mounted in the cab and operatively connected to brake operating arms 34a by suitable shafts and links 36 and 36a shown in broken lines in Fig. 3. By this controlled differential steering of the draft unit can be effected, as later will be described.

Each jack shaft 33 is operatively connected to that pair of traction wheels W at one side of the frame E, by a universal joint 37 one part of which is connected to the outer end of the jack shaft, while the other part is connected to a driving head 38. This driving head is journalled on the inner end of a trunnion 39 so supported in a box 40 as to be disposed coaxially with the jack shaft 33. The box 40 is formed on the respective end of a bolster 40a and provides a pivotal support for a rocker arm 41, secured to and extending transversely of the frame E.

The rocker arm 41 is in the form of a rigid bar, and in each end is fixed a tubular axle 42 containing a stub shaft 43 for driving the respective wheel W. The two shafts 43 for the two wheels are adapted to be driven by chain and sprocket mechanisms which comprise driving sprockets 44 fixed on the driving head 38 and operatively connected to driven sprockets 45 by endless chains 46. Each sprocket 45 is bolted to a head 47 journalled on the axle 42 and provided with a cap 48 splined on the shaft 43 to provide a driving connection between the sprocket 45 and the shaft 43. The other end of the shaft 43 carries a cap 49 secured to a hub 50 journalled on the axle 42. A sleeve 51 surrounds the axle 42 and is directly secured to the rocker arm 41 and provides means for confining the axle and shaft against longitudinal play. The hub 50 has secured thereto a rim 52 upon which the tire of the wheel is mounted, and it also carries a brake 53 by which rotation of the wheel may be controlled from the cab by any suitable mechanism (not shown).

The aforedescribed mounting for the wheels at either side of the frame E allows vertical movements of the wheels to compensate for uneven terrain, the rocker arm 41 rocks about the trunnion 39 as a center to allow of such vertical movements. The sprocket and chain driving means insures of the proper driving of the wheels irrespective of the position of the rocker arms as a consequence of vertical movement of the wheels. It will be understood that the universal joints 37 maintain proper driving connections between the jack shafts and the driving heads without setting up injurious stresses resulting from distortion of the bolster and the frame.

From the preceding description, it becomes manifest that the trailer unit is characterized by the complete elimination of the two dirigible wheels of the conventional draft unit and the accompanying steering mechanism therefor, and the use of only four traction wheels all of which are driven from a single engine, with the engine and the mechanism by which the wheels are driven from engine, all carried by the draft unit. By this arrangement is permitted the use of a draft unit of relatively short wheelbase to increase its stability and ready steering through the controlled differential mechanism which is accomplished by actuating one brake 34 or the other through the levers 35 to retard rotation of one pair of traction wheels W or the other, and in consequence cause rotation of the draft unit frame about the fifth wheel F as a center, and in one direction or the other to effect steering of the vehicle as a whole.

Not only are all four wheels of the draft unit positively driven, but the mounting of the wheels permits of their movements through vertical arcs to compensate for uneven terrain, thus reducing to a minimum vertical movement of the draft unit as a whole.

Although I have herein shown and described only one form of motor vehicle embodying my invention, it is to be understood that various changes and modifications may be made herein without departing from the spirit of my invention and the spirit and scope of the appended claims.

I claim:

1. A tractor vehicle, including: a frame; traction wheels, two at each side of said frame; a cab at one end of said frame; an engine on said frame adjacent said cab; a differential mechanism supported on said frame; a pair of jack shafts extending transversely of said frame, and operatively connected to said mechanism, one shaft for each pair of traction wheels; chain and sprocket connections between each pair of traction wheels and the corresponding jack shaft; means for operatively connecting said engine with said mechanism, comprising a first shaft extending rearwardly from and operatively connected to said engine, a second shaft operatively connected to said mechanism and disposed below said first shaft, and a transfer case disposed to the rear of said differential mechanism and operatively connected between said first and second shafts; brakes for said jack shafts; and means in said cab for manually operating said brakes independently of each other to control rotation of said jack shafts and thereby control driving of one pair of wheels independently of the other to effect steering of the vehicle.

2. A tractor vehicle, including: a frame; traction wheels, two at each side of said frame; an engine on one end of said frame; a differential mechanism on said frame; a pair of jack shafts transversely of said frame; and operatively connected to said mechanism, one shaft for each pair of traction wheels; chain and sprocket connections between each pair of traction wheels and the corresponding jack shaft; means operatively connecting said engine with said mechanism, comprising a first shaft extending from and operatively connected to said engine, a second shaft below said first shaft, and operatively connected to said mechanism, and a transfer case operatively connecting said shafts to each other; brakes for said jack shafts; and means on said frame for manually operating said brakes independently of each other to control rotation of said jack shafts and thereby control driving of one pair of said wheels independently of the other to effect steering of the vehicle.

HENRY C. HARBERS.

REFERENCES CITED

The following references are of record in the file of this patent:

UNITED STATES PATENTS

| Number | Name | Date |
|---|---|---|
| 2,135,906 | Merry | Nov. 8, 1938 |
| 2,193,893 | VanVleck | Mar. 19, 1940 |
| 2,317,972 | Ash | May 4, 1943 |
| 2,219,533 | Ross | Oct. 29, 1940 |
| 2,156,601 | Mosling et al. | May 2, 1939 |
| 2,311,922 | Allin | Feb. 23, 1943 |
| 2,157,376 | Zeilman | May 9, 1939 |
| 1,627,225 | Babel et al. | May 3, 1927 |
| 2,280,741 | Bolster et al. | Apr. 21, 1942 |
| 2,126,876 | Doman | Aug. 16, 1938 |
| 1,660,475 | Carter | Feb. 28, 1928 |